United States Patent
Nemoto et al.

(10) Patent No.: US 10,557,386 B2
(45) Date of Patent: Feb. 11, 2020

(54) VALVE TIMING CONTROLLER

(71) Applicant: DENSO CORPORATION, Kariya, Aichi-pref. (JP)

(72) Inventors: Kazuaki Nemoto, Kariya (JP); Hiroshi Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/159,878

(22) Filed: Oct. 15, 2018

(65) Prior Publication Data

US 2019/0120092 A1 Apr. 25, 2019

(30) Foreign Application Priority Data

Oct. 19, 2017 (JP) .................. 2017-202342

(51) Int. Cl.
*F01L 1/352* (2006.01)
*F01L 1/02* (2006.01)
*F16H 49/00* (2006.01)

(52) U.S. Cl.
CPC ............... *F01L 1/352* (2013.01); *F01L 1/022* (2013.01); *F16H 49/001* (2013.01)

(58) Field of Classification Search
CPC ... F01L 1/344; F01L 1/352; F01L 2001/3521; F01L 1/46; F01L 2013/103; F01L 2820/032; F16H 49/001
USPC .......................................... 123/90.15, 90.17
See application file for complete search history.

(56) References Cited

U.S. PATENT DOCUMENTS

| | | | | |
|---|---|---|---|---|
| 2007/0163526 A1* | 7/2007 | Sugiura | ................... | F01L 1/352 |
| | | | | 123/90.17 |
| 2008/0210182 A1* | 9/2008 | Schaefer | ................... | F01L 1/34 |
| | | | | 123/90.17 |
| 2016/0024977 A1* | 1/2016 | Takahashi | ................. | F01L 1/34 |
| | | | | 123/90.15 |
| 2016/0290181 A1* | 10/2016 | Otsubo | .................... | F01L 1/352 |
| 2018/0038246 A1* | 2/2018 | Toda | ........................ | F01L 1/352 |
| 2018/0073656 A1* | 3/2018 | Miyachi | ................ | F16K 31/047 |

FOREIGN PATENT DOCUMENTS

| | | |
|---|---|---|
| DE | 10 2014 211 518 | 1/2016 |
| JP | 4200377 | 12/2008 |
| JP | 5494547 | 5/2014 |
| JP | 5692001 | 4/2015 |

* cited by examiner

*Primary Examiner* — Jorge L Leon, Jr.
(74) *Attorney, Agent, or Firm* — Nixon & Vanderhye PC

(57) ABSTRACT

A joint includes a rotation transmitting portion and a stopper portion. The rotation transmitting portion abuts on a relative rotating portion in a circumferential direction. The stopper portion is capable of abutting on the relative rotating portion to restrict an axial position of the relative rotating portion. The stopper portion of the joint which rotates at the same speed as the relative rotating portion restricts an axial position of the relative rotating portion, whereby a sliding movement does not occur between the relative rotating portion and the stopper portion. It can be restricted that a power transmission efficiency is decreased and an abrasive wear is generated.

11 Claims, 16 Drawing Sheets

US 10,557,386 B2

VALVE TIMING CONTROLLER

CROSS REFERENCE TO RELATED APPLICATION

This application is based on Japanese Patent Application No. 2017-202342 filed on Oct. 19, 2017, the disclosure of which is incorporated herein by reference.

TECHNICAL FIELD

The present disclosure relates to a valve timing controller.

BACKGROUND

A valve timing controller is provided in a power transmission path between a driving shaft and a driven shaft of an internal combustion engine to adjust a valve timing of an intake valve or an exhaust valve. The valve timing controller includes a driving unit which outputs rotational power, a first rotating body which rotates synchronously with the driving shaft, a second rotating body which is provided to an end of the driven shaft, and a relative rotating portion which is provided in the first rotating body. The relative rotating portion rotates relative to the first rotating body, whereby a relative rotation phase between the first rotating body and the second rotating body is varied. The relative rotating portion shown in JP 04200377 B2 is configured by a planetary gear. The relative rotating portion shown in DE 102014211518 A1 is configured by a strain wave gear.

The relative rotating portion is movable relative to the first rotating body in an axial direction. In order to avoid a disengagement of the relative rotating portion, a cover fixed to the first rotating body supports the relative rotating portion.

When a valve timing is adjusted, the relative rotating portion rotates relative to the cover. Thus, a sliding movement between the relative rotating portion and the cover may deteriorate a power transmission efficiency and may cause an abrasive wear.

SUMMARY

It is an object of the present disclosure is to provide a valve timing controller which is able to suppress a reduction in power transmission efficiency and an abrasive wear.

According to the present disclosure, a valve timing controller includes a drive unit outputting a rotational power, a first rotating body provided on a rotation axis of one of the driving shaft and the driven shaft to rotate synchronously with another of the driving shaft and the driven shaft; a second rotating body provided to an end portion of the one of the driving shaft and the driven shaft to rotate along with the one of the driving shaft and the driven shaft; a relative rotating portion transmitting the rotational power between the first rotating body and the second rotating body; and a joint connecting the drive unit and the relative rotating portion.

The relative rotating portion is provided in the first rotating body between the drive unit and the second rotating body, and is movable relative to the first rotating body in an axial direction. The relative rotating portion transmitting a rotational power between the first rotating body and the second rotating body, and varies a relative rotation phase between the first rotating body and the second rotting body.

The joint includes a rotation transmitting portion which abuts on the relative rotating portion in a circumferential direction, and a stopper portion which abuts on the relative rotating portion in an axial direction to restrict an axial position of the relative rotating portion.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Various embodiments will be described with reference to the accompanying drawings. In the following embodiments, substantially identical elements have the same numerals, and description of the identical elements will not be repeated.

First Embodiment

Figure 1:
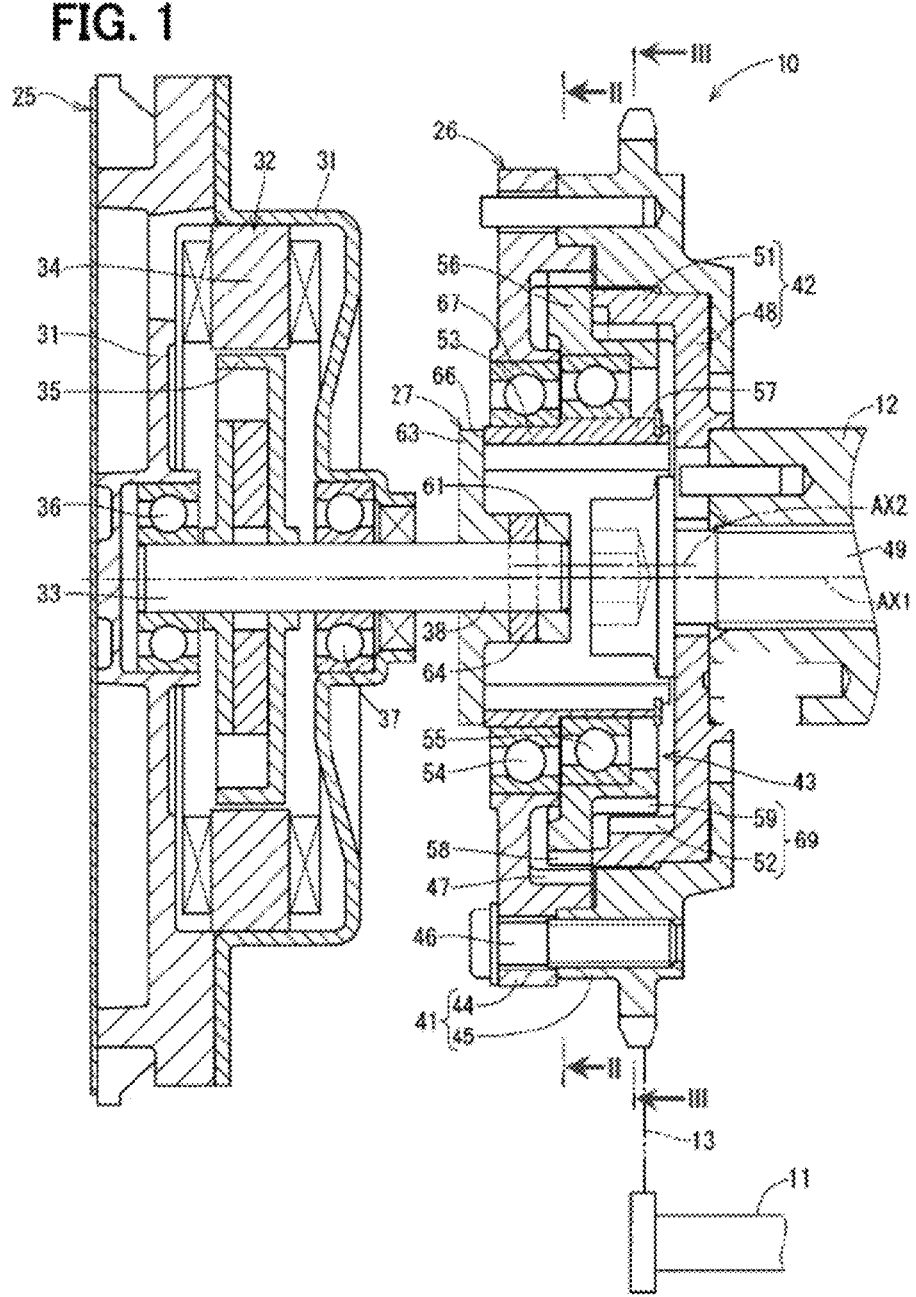
FIG. 1 is a longitudinal sectional view showing a valve timing controller according to a first embodiment.

FIG. 1 shows a valve timing controller according to a first embodiment. The valve timing controller 10 is provided in a power transmission path between a driving shaft 11 and a camshaft 12 of an internal combustion engine to adjust a valve timing of an intake valve or an exhaust valve driven by the camshaft 12.

Referring to FIGS. 1 to 5, the valve timing controller 10 will be described. The valve timing controller 10 is provided with a drive unit 25, a speed reduction mechanism unit 26, and a joint 27.

Figure 2:
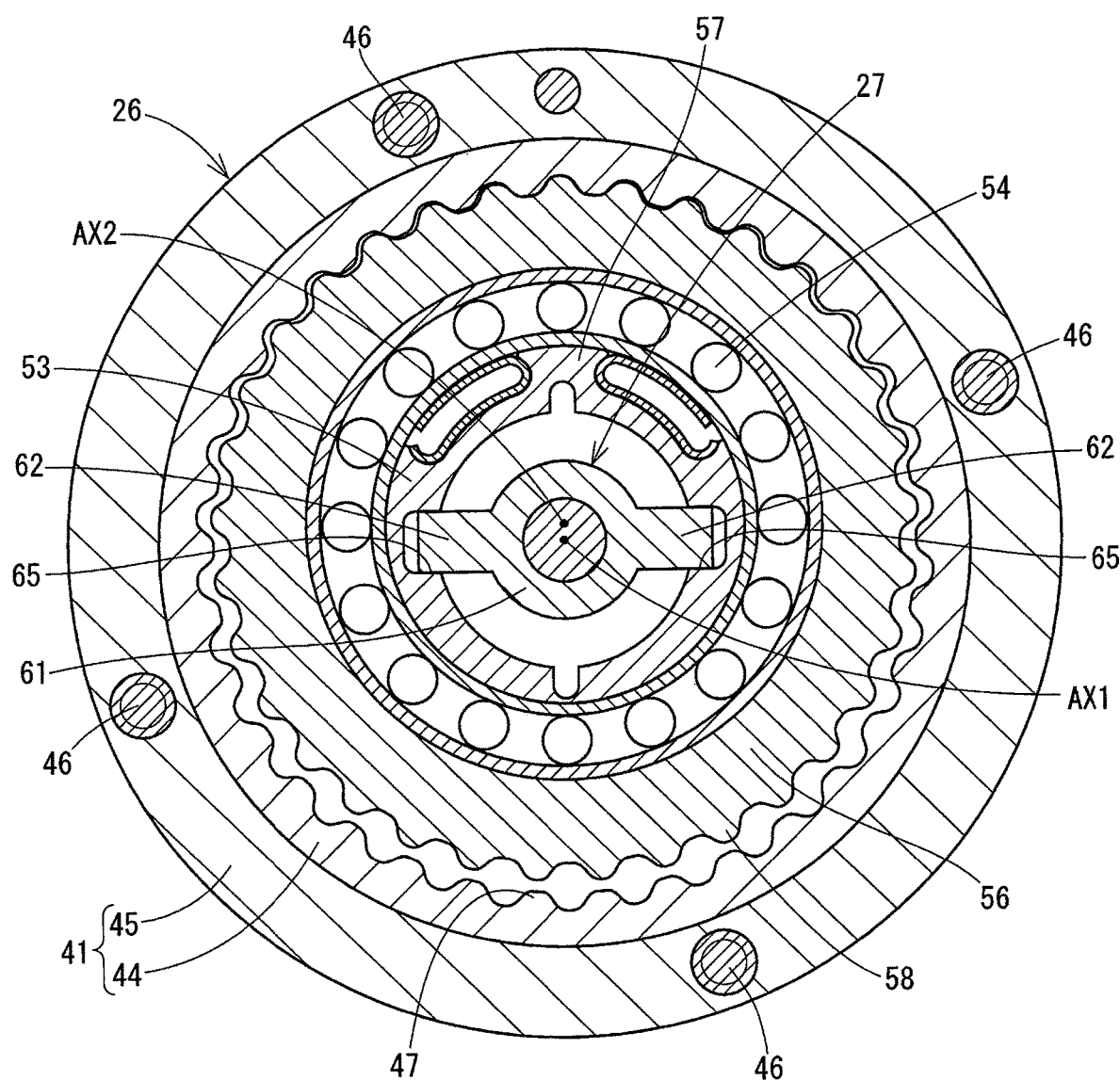
FIG. 2 is a cross sectional view taken along a line II-II in FIG. 1.
Figure 3:
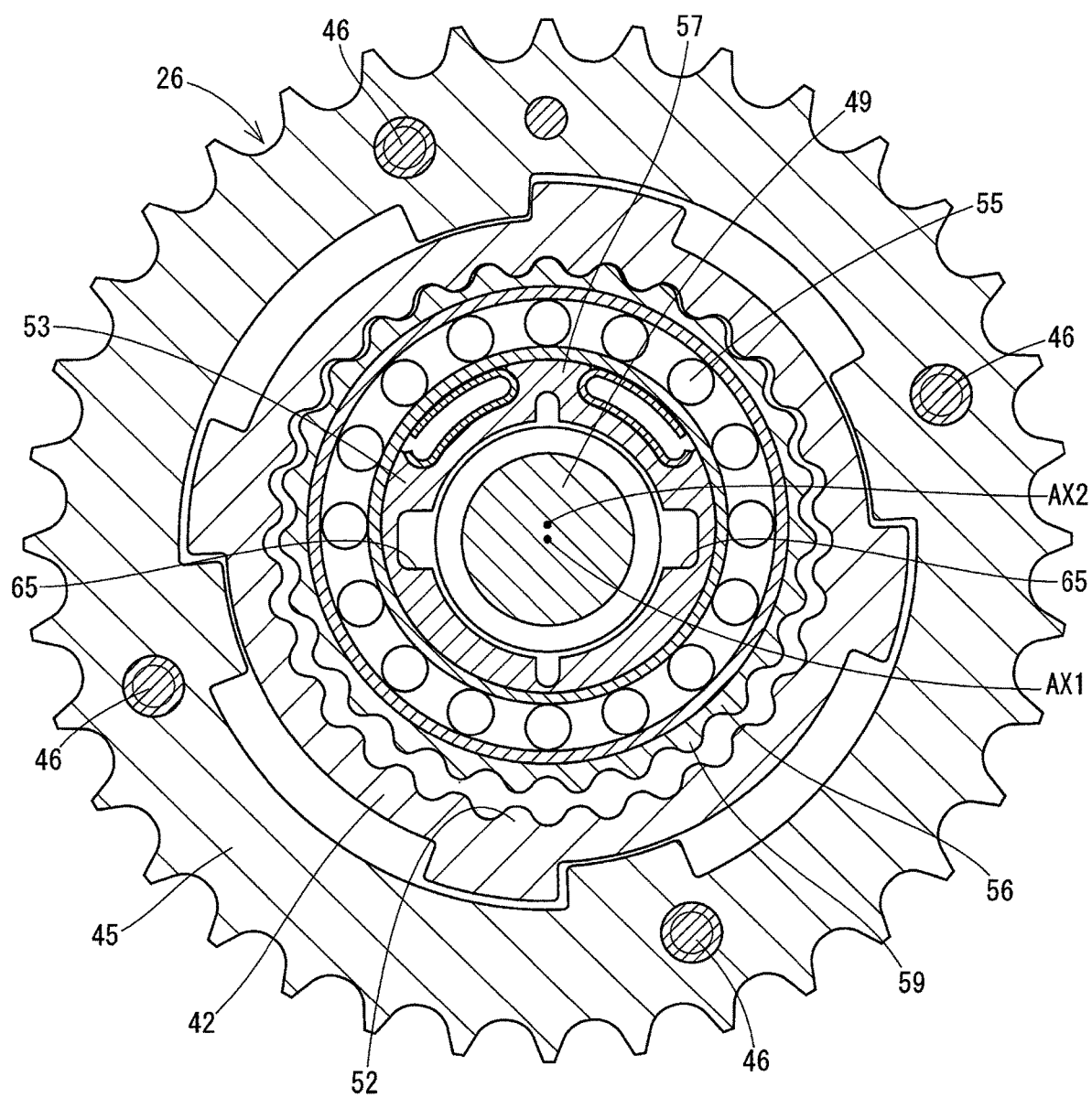
FIG. 3 is a cross sectional view taken along a line III-III in FIG. 1.
Figure 4:
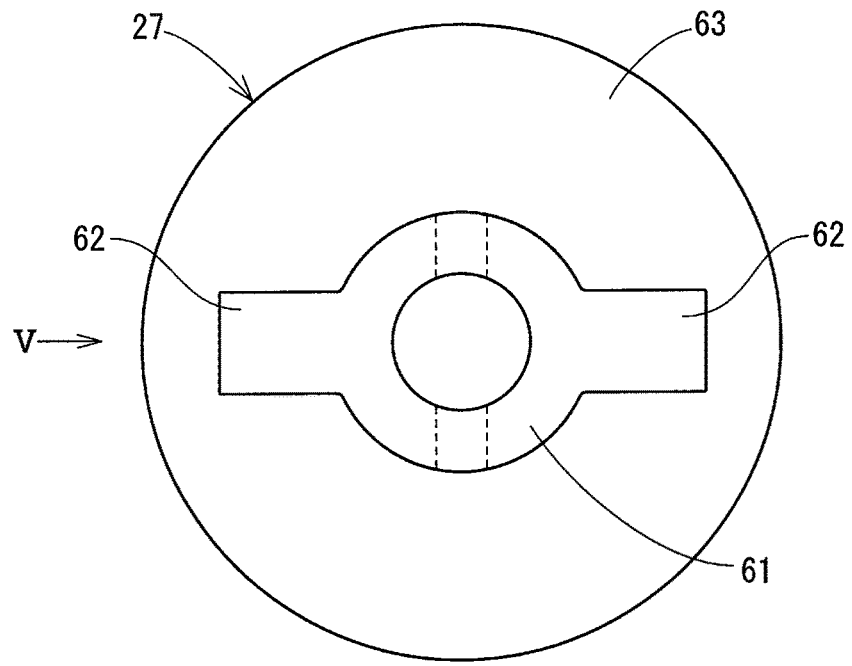
FIG. 4 is a front view of a joint shown in FIG. 1.
Figure 5:
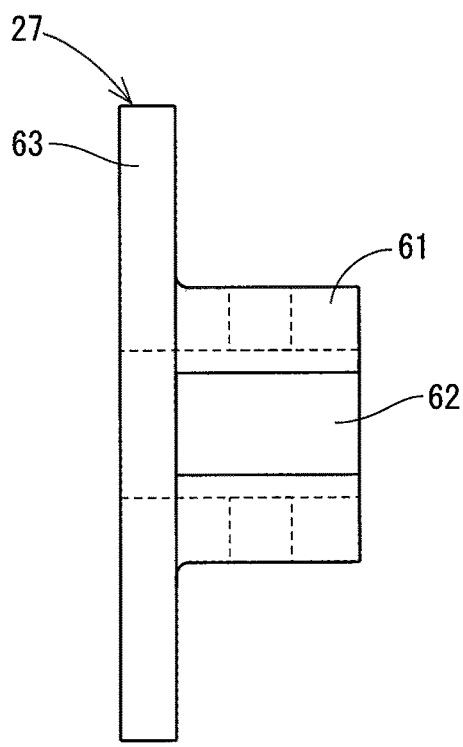
FIG. 5 is a side view of the joint in a direction of an arrow V in FIG. 4.

As shown in FIGS. 1 to 3, the drive unit 25 includes a housing 31, a motor 32 and an output shaft 33. The motor 32 has a stator 34 which is fixed in the housing 31 and a rotor 35 which is rotatable in the stator 34. The output shaft 33 is supported by bearings 36, 37 and rotates along with the rotor 35. One end portion 38 of the output shaft 33 extends outside of the housing 31. The drive unit 25 is provided on a rotation axis AX1 of the camshaft 12, and is fixed to a chain cover (not shown).

The speed reduction mechanism unit 26 is provided between the drive unit 25 and the camshaft 12. The speed reduction mechanism unit 26 includes a first rotating body 41, a second rotating body 42 and a relative rotating portion 43.

The first rotating body 41 is disposed on the rotation axis AX1, and includes a front cover 44 and a sprocket 45. The front cover 44 and the sprocket 45 are fixed to each other by a screw 46. A first internal teeth portion 47 is formed on an inner side of the front cover 44. The sprocket 45 is connected to the crankshaft 11 through a chain 13. Thus, the first rotating body 41 rotates in synchronization with the crankshaft 11.

The second rotating body 42 is formed in a cup shape and is provided inside of the sprocket 45. A bottom portion 48 of the second rotating body 42 is fixed to an end portion of the camshaft 12 by a bolt 49. Thus, the second rotating body 42 rotates along with the camshaft 12. A cylindrical portion 51 of the second rotating body 42 protrudes from the bottom portion 48 toward the front cover 44. A second internal teeth portion 52 is formed on an inner side of the cylindrical portion 51.

The relative rotating portion 43 is provided in the first rotating body 41 between the drive unit 25 and the second rotating body 42. The relative rotating portion 43 has an input rotating body 53, a coaxial bearing 54, an eccentric bearing 55, and a planetary rotating body 56. The input rotating body 53 is cylindrically shaped, and is provided coaxially with the rotation axis AX1. The coaxial bearing 54 is provided between an inner wall of the front cover 44 and the input rotating body 53. The input rotating body 53 has an eccentric portion 57 which is eccentric with respect to the rotation axis AX1. The eccentric bearing 55 is engaged with an outer surface of the eccentric portion 57. The planetary rotating body 56 is rotatably supported by the eccentric bearing 55 around an eccentric axis AX2 of the eccentric portion 57. The planetary rotating body 56 has a first external teeth portion 58 which is capable of being engaged with the first internal teeth portion 47, and a second external teeth portion 59 which is capable of being engaged with the second internal teeth portion 52.

The input rotating body 53 is movable relative to the front cover 44 in its axial direction. In addition, the planetary rotating body 56 is movable relative to the first rotating body 41 and the second rotating body 42 in the axial direction. Thus, the relative rotating portion 43 is movable relative to the first rotating body 41 and the second rotating body 42 in the axial direction.

The relative rotating portion 43 transmits rotational power between the first rotating body 41 and the second rotating body 42 through an engaging portion between the first internal teeth portion 47 and the first external teeth portion 58 and an engaging portion between the second internal teeth portion 52 and the second external teeth portion 42.

When the input rotating body 53 rotates relative to the first rotating body 41, the planetary rotating body 56 rotates around the eccentric axis AX2 and revolves around the rotation axis AX1. The relative rotating portion 43 varies a relative rotation phase between the first rotating body 41 and the second rotating body 42. At this time, the relative rotation speed of the input rotating body 53 with respect to the first rotating body 41 is decelerated and is transmitted to the second rotating body 42. The second external teeth portion 59 and the second internal teeth portion 52 constitute a transmission mechanism portion 69 which transmits a rotation of the planetary rotating body 56 to the second rotating body 42.

As shown in FIGS. 1, 2, 4 and 5, the joint 27 connects the drive unit 25 and the relative rotating portion 43. The joint 27 has a fixed portion 61, a rotation transmitting portion 62 and a stopper portion 63. The fixed portion 61 is cylindrically shaped and engaged with an end portion 38 of the output shaft 33 by means of a press-fit pin 64.

The rotation transmitting portion 62 is engaged with an engaging portion 65 of the input rotating body 53. The rotation transmitting portion 62 abuts on the input rotating body in a circumferential direction to transmit the rotational power therebetween. In the present embodiment, the rotation transmitting portion 62 is a protrusion which protrudes radially outward form the fixed portion 61. The engaging portion 65 is a groove formed on an inner wall of the input rotating body 53. The rotation transmitting portion 62 is inserted into the engaging portion 65 in a radial direction.

The stopper portion 63 is capable of abutting on an end surface 66 of the input rotating body 53 to restrict an axial position of the relative rotating portion 43. In the present embodiment, the stopper portion 63 is an annular flange which radially protrudes from the fixed portion 61. An outer diameter of the stopper portion 63 is larger than outer diameter of the rotation transmitting portion 62, and is smaller than an inner diameter of an outer ring 67 of the coaxial bearing 54.

Advantages

As described above, according to the first embodiment, the joint 27 has the rotation transmitting portion 62 and the stopper portion 63. The rotation transmitting portion 62 abuts on the relative rotating portion 43 in the circumferential direction. The stopper portion 63 is capable of abutting on an end surface 66 of the input rotating body 53 to restrict an axial position of the relative rotating portion 43.

The stopper portion 63 of the joint 27 which rotates at the same speed as the relative rotating portion 43 restricts an axial position of the relative rotating portion 43, whereby a sliding movement does not occur between the relative rotating portion 43 and the stopper portion 63. Thus, it can be restricted that a power transmission efficiency is decreased and an abrasive wear is generated.

In a configuration where a biasing member is arranged between the relative rotating portion and a joint member, as shown in JP-04200377B2, it is relatively difficult to assemble them. Further, dynamically, a relative position between the drive unit and the relative rotating portion is varied, and a position of the biasing member is unstable. A load applied to the biasing member is unstable, which may damage the biasing member.

According to the first embodiment, since the stopper portion 63 of the joint 27 abuts on the relative rotating portion 43 directly, above subjects can be solved.

According to the first embodiment, the first internal teeth portion 47, the second internal teeth portion 52 and the relative rotating portion 43 configure a planetary gear mechanism. The relative rotating portion 43 has the input rotating body 53, the coaxial bearing 54, the eccentric bearing 55, the planetary rotating body 56 and the transmission mechanism portion 69. The coaxial bearing 54 is provide on a side of the input rotating body 53 with respect to the eccentric portion 57, and is provided between first rotating body 41 and the input rotating body 53. The eccentric bearing 55, the planetary rotating body 56 and the transmission mechanism portion 69 are provide on a side of the eccentric portion 57 with respect to the coaxial bearing 54. The stopper portion 63 of the joint 27 can abuts on the input rotating body 53 in the axial direction. The outer diameter of the stopper portion 63 is smaller than the inner diameter of the outer ring 67 of the coaxial bearing 54.

As described above, it is avoided that the stopper portion 63 is brought into contact with the outer ring 67. Thus, it can be avoided that a power transmission efficiency is decreased and an abrasive wear is generated due to a sliding movement between the stopper portion 63 and the outer ring 67.

Second Embodiment

Figure 6:
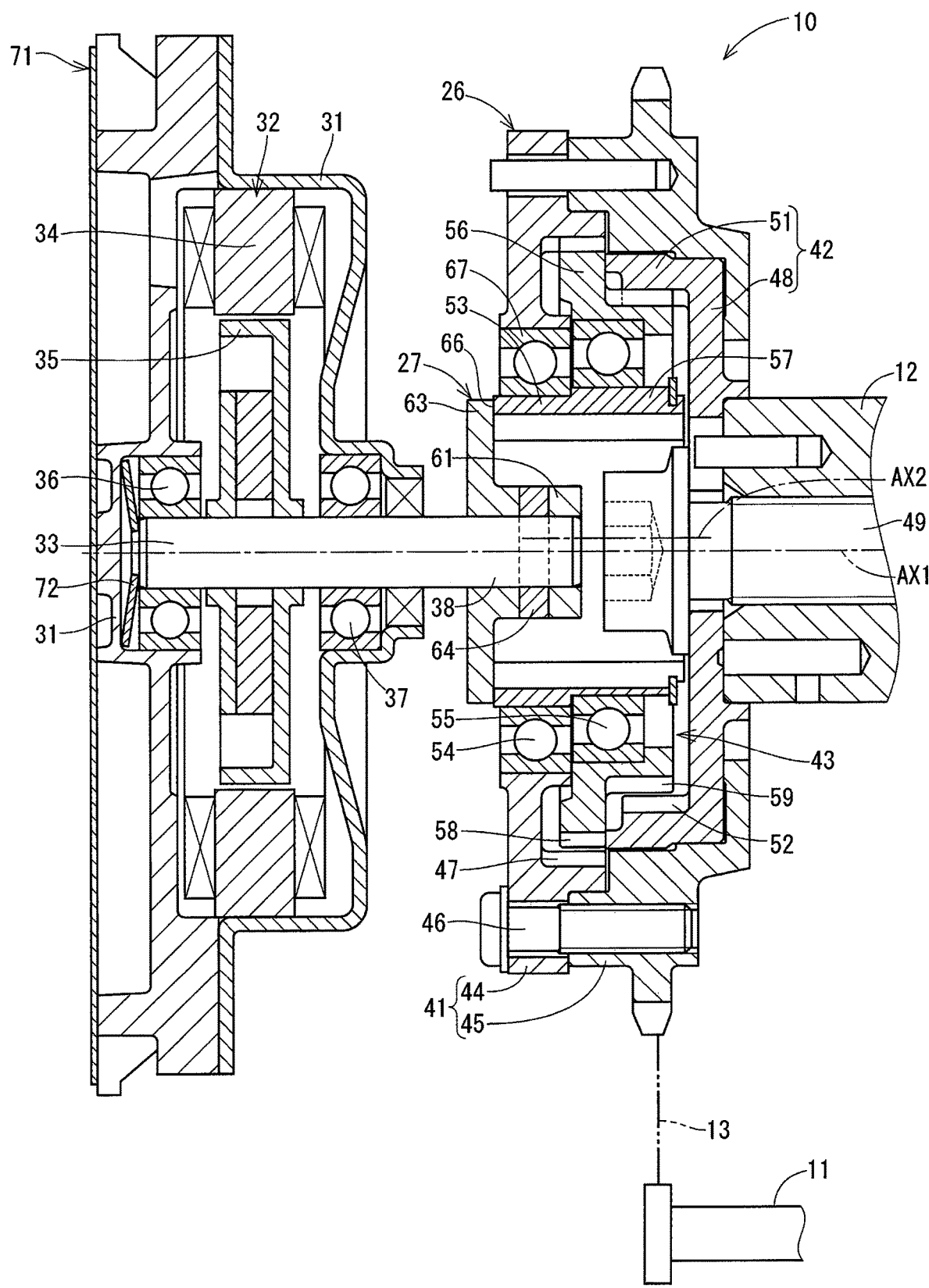
FIG. 6 is a longitudinal sectional view showing a valve timing controller according to a second embodiment.

As shown in FIG. 6, a drive unit 71 is provided with a biasing member 72. The biasing member 72 is provided in the housing 31 to bias the output shaft 33 toward the relative rotating portion 43.

The biasing member 72 prevents uneven abrasive wear of the motor 32 and the bearings 36, 37. The biasing member 72 performs a positioning of the relative rotating portion 43 in the axial direction. Even if the biasing member 72 is damaged, the damaged biasing member 72 remains in the housing 31, so that a piece of the damaged biasing member does not fall into the internal combustion engine.

Third Embodiment

Figure 7:
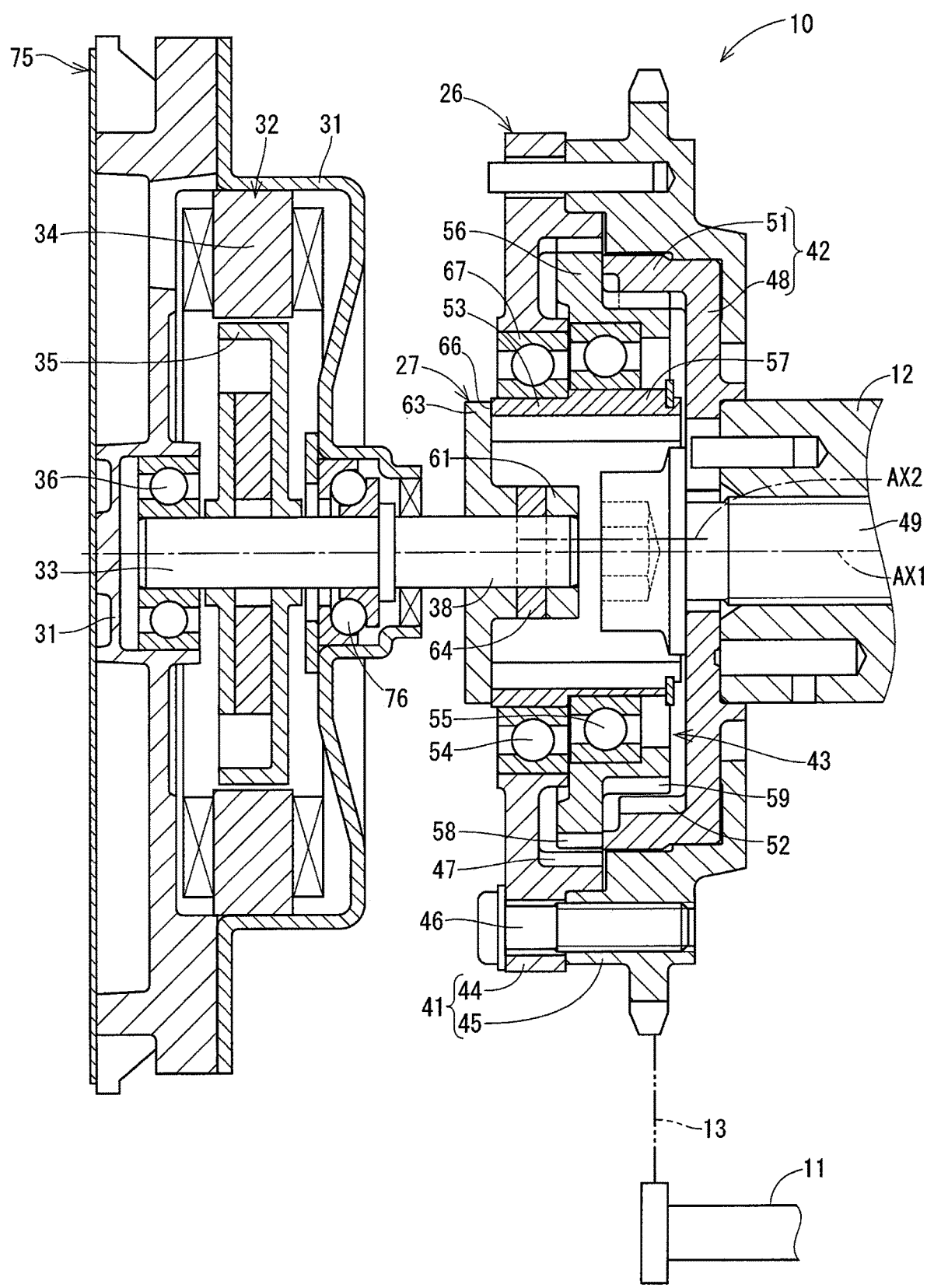
FIG. 7 is a longitudinal sectional view showing a valve timing controller according to a third embodiment.

As shown in FIG. 7, a drive unit 75 is provided with a bearing 76 which functions as a pressurizing member. The bearing 76 can receive both radial load and thrust load. The bearing 76 supports the output shaft 33 and pressurizes the output shaft 33 toward the relative rotating portion 43. As such, similar effects to the second embodiment are achieved.

Fourth Embodiment

Figure 8:
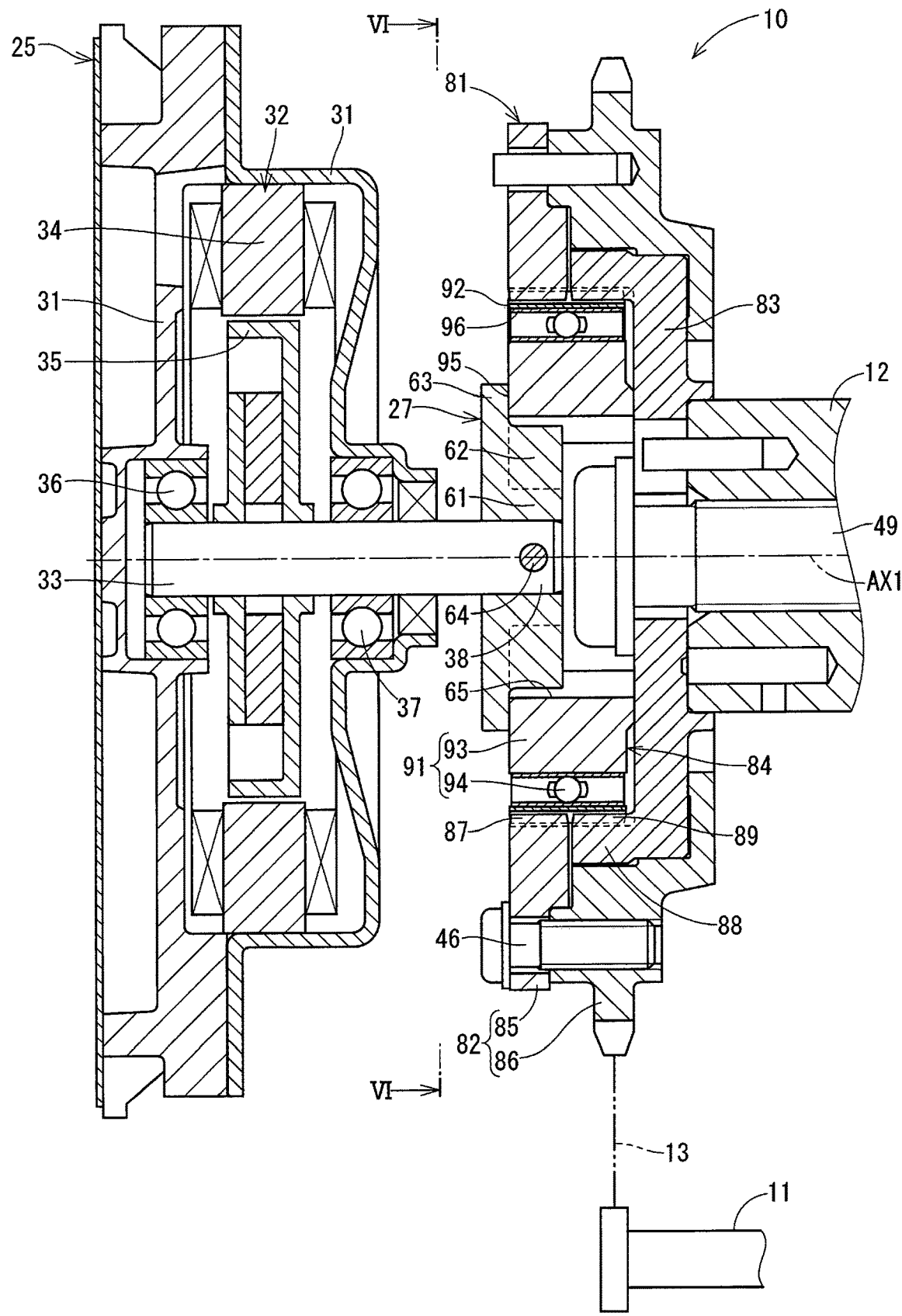
FIG. 8 is a longitudinal sectional view showing a valve timing controller according to a fourth embodiment.
Figure 9:
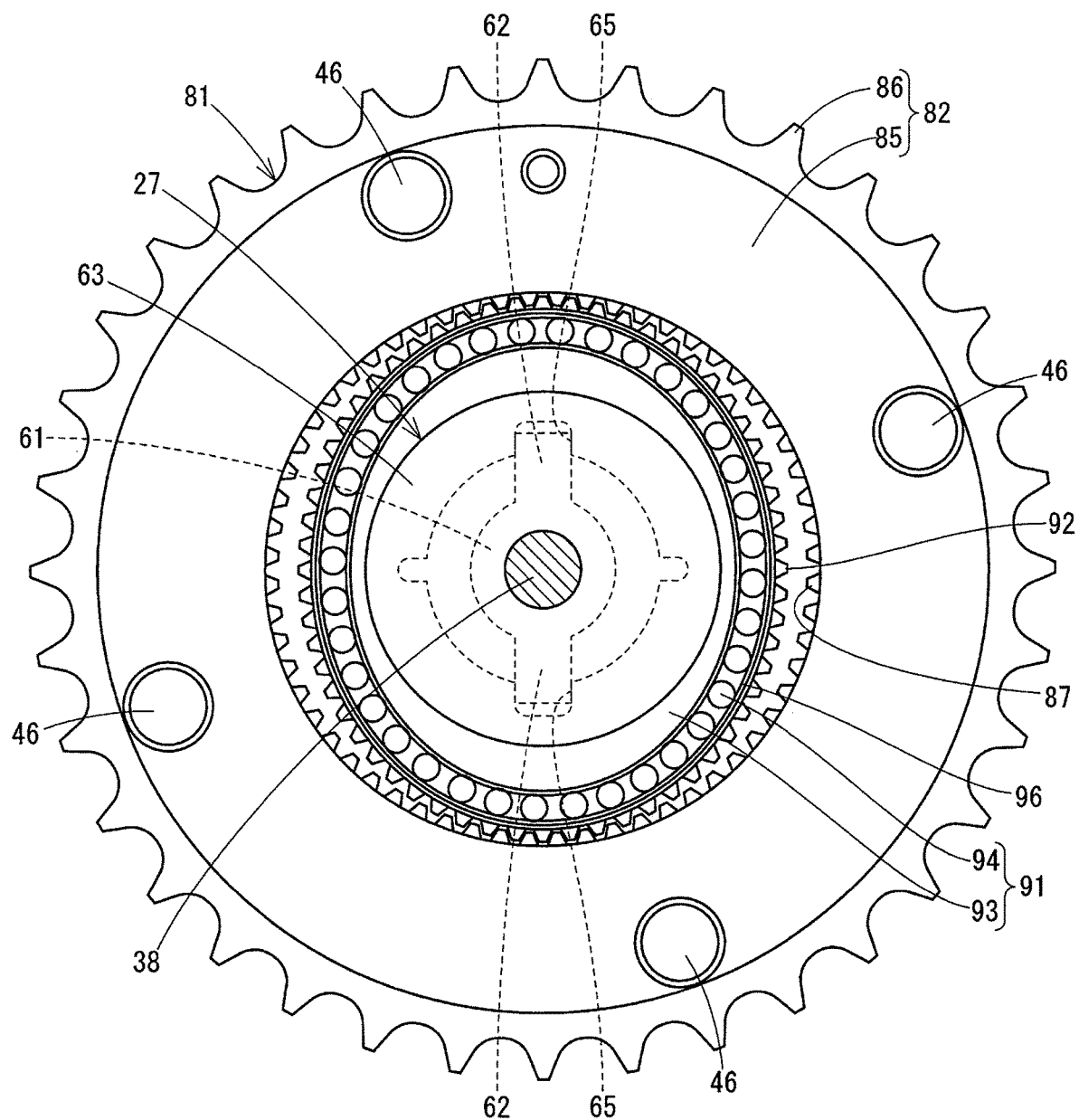
FIG. 9 is a cross sectional view taken along a line VI-VI in FIG. 8.

As shown in FIGS. 8 and 9, a speed reduction mechanism unit 81 is a strain wave gear. The speed reduction mechanism unit 81 includes a first rotating body 82, a second rotating body 83, and a relative rotating portion 84. The first rotating body 82 includes a first circular spline 85 and a sprocket 86. The first circular spline 85 has a first internal spline 87 on its inner side.

The second rotating body 83 has a second circular spline 88. The second circular spline 88 has a second internal spline 89. The second internal spline 89 has a different number of teeth from the first internal spline 87. For example, the number of teeth of the second internal spline 89 is two more than the number of teeth of the first internal spline 87.

The relative rotating portion 84 has a wave generator 91 and a flex spline 92. The wave generator 91 has an elliptical cam 93 and a cam bearing 94 which is provide on an outer periphery of the cam 93. The cam 93 is connected to the drive unit 25 through the joint 27. The flex spline 92 is a cylindrical elastic member which is engaged with the cam bearing 94. The wave generator 91 makes the flex spline 92 into an ellipse shape. A major diameter portion of the flex spline 92 is engaged with the first circular spline 85 and the second circular spline 88.

The relative rotating portion 84 transmits a rotational power between the first rotating body 82 and the second rotating body 83 through an engaging portion between the first internal spline 87 and the flex spline 92 and an engaging portion between the second internal spline 89 and the flex spline 92.

When the wave generator 91 rotates relative to the first rotating body 82, engaging positions between the flex spline 92, the first circular spline 85 and the second circular spline 88 move in a circumferential direction, whereby the relative rotating portion 84 varies a relative rotation phase between the first rotating body 82 and the second rotating body 83. At this time, the relative rotation speed of the wave generator 91 with respect to the first rotating body 82 is decelerated and transmitted to the second rotating body 83.

The stopper portion 63 is capable of abutting on an end surface 95 of the cam 93 to restrict an axial position of the relative rotating portion 84. An outer diameter of the stopper portion 63 is smaller than a minor diameter of the outer ring 96 of the cam bearing 94.

As described above, according to the fourth embodiment, although a configuration of the speed reduction mechanism unit 81 is different from that of the first embodiment, a configuration of the joint 27 is the same as the first embodiment. The stopper portion 63 is capable of abutting on the relative rotating portion 84 in the axial direction to restrict an axial position of the relative rotating portion 84. Since there is no sliding movement between the relative rotating portion 84 and the stopper portion 63, it can be restricted that a power transmission efficiency is deteriorated and an abrasive wear is generated.

Fifth Embodiment

Figure 10:
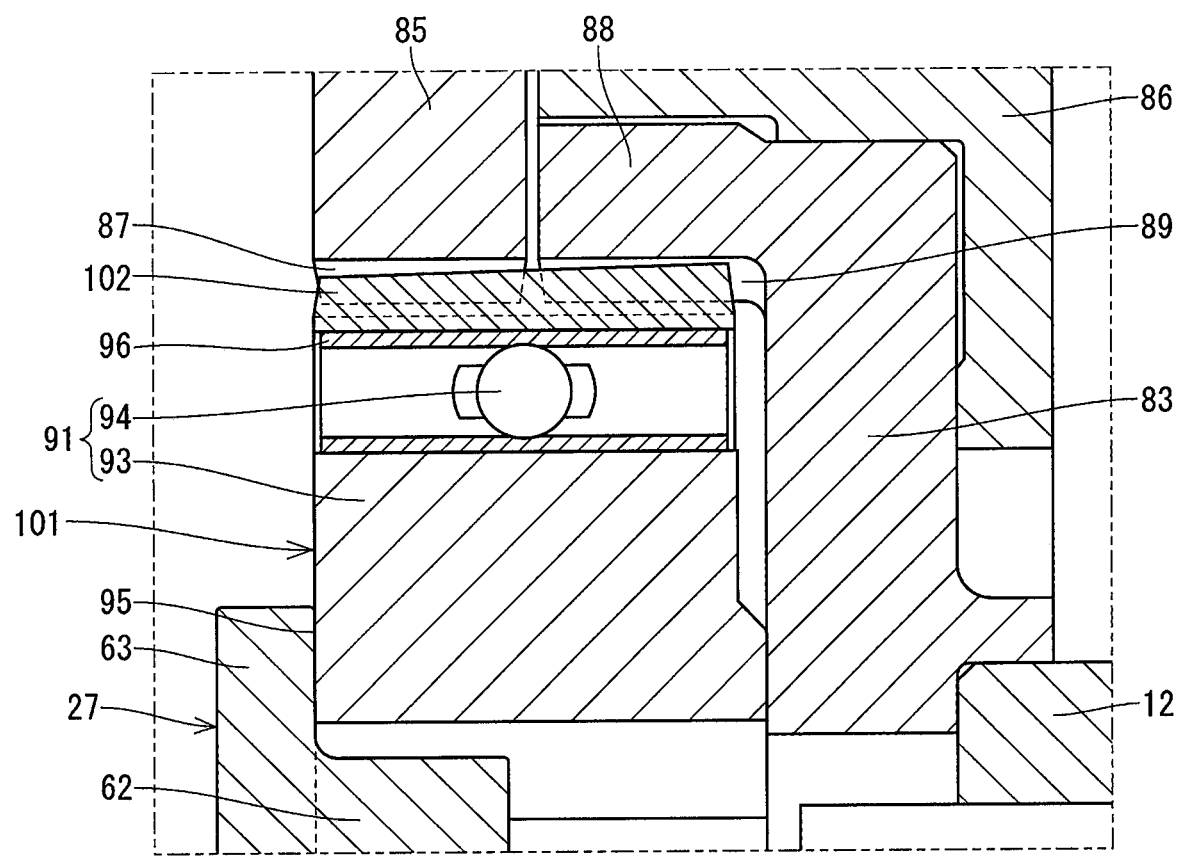
FIG. 10 is an enlarged cross sectional view showing a flex spline of a valve timing controller according to a fifth embodiment.

As shown in FIG. 10, the teeth of the flex spline 102 of the relative rotating portion 101 is tapered so that its outer diameter becomes smaller from a side of the second rotating body 83 to a side of the drive unit 25. In FIG. 10, a gradient of the teeth of the flex spline 102 is shown larger than an actual configuration for easy understanding of the configuration. By making the teeth of the flex spline 102 in a tapered shape, a component force is generated to the second rotating body 83 in the axial direction. Thus, it is possible to prevent the flex spline 102 from coming out to a side of the drive unit 25.

Sixth Embodiment

Figure 11:
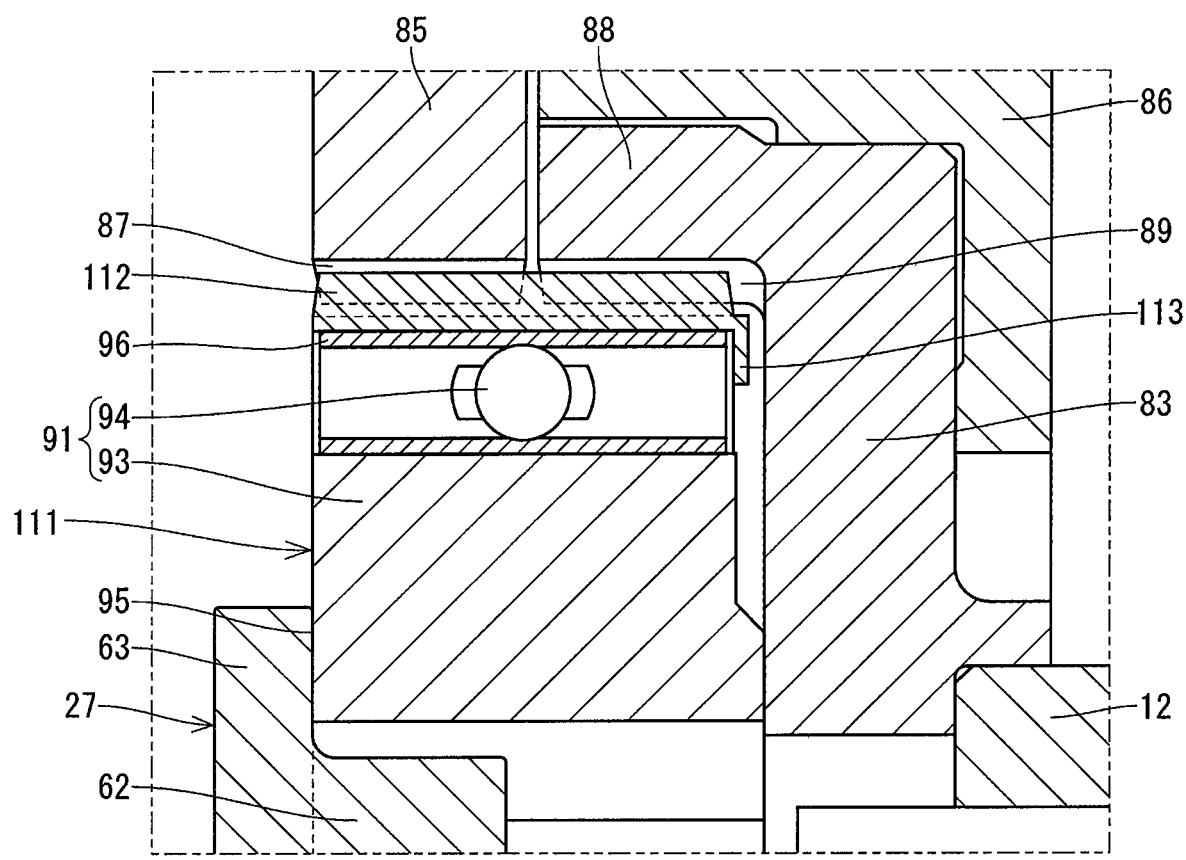
FIG. 11 is an enlarged cross sectional view showing a flex spline of a valve timing controller according to a sixth embodiment.
Figure 12:
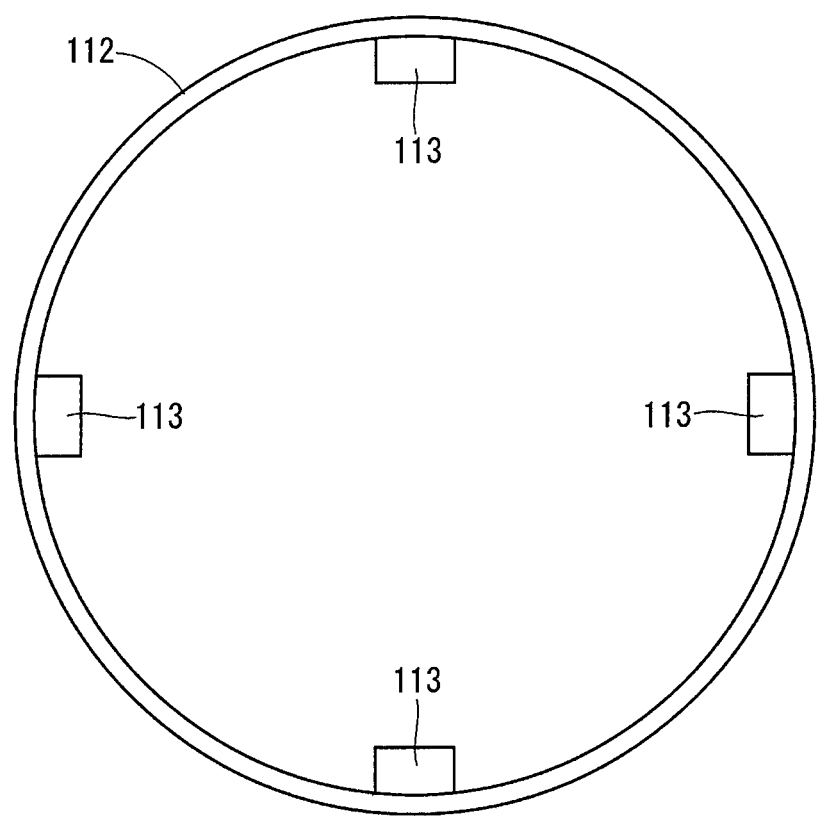
FIG. 12 is a front view of a flex spline shown in FIG. 11.

As shown in FIG. 11, the flex spline 112 of the relative rotating portion 111 has a stopper 113 which is capable of abutting on the cam bearing 94. The stopper 113 is a protrusion which protrudes radially inward. As shown in FIG. 12, four stoppers 113 are provided at equal intervals in a circumferential direction. By providing the stopper 113, it is possible to prevent the flex spline 112 from coming out to a side of the drive unit 25.

Seventh Embodiment

Figure 13:
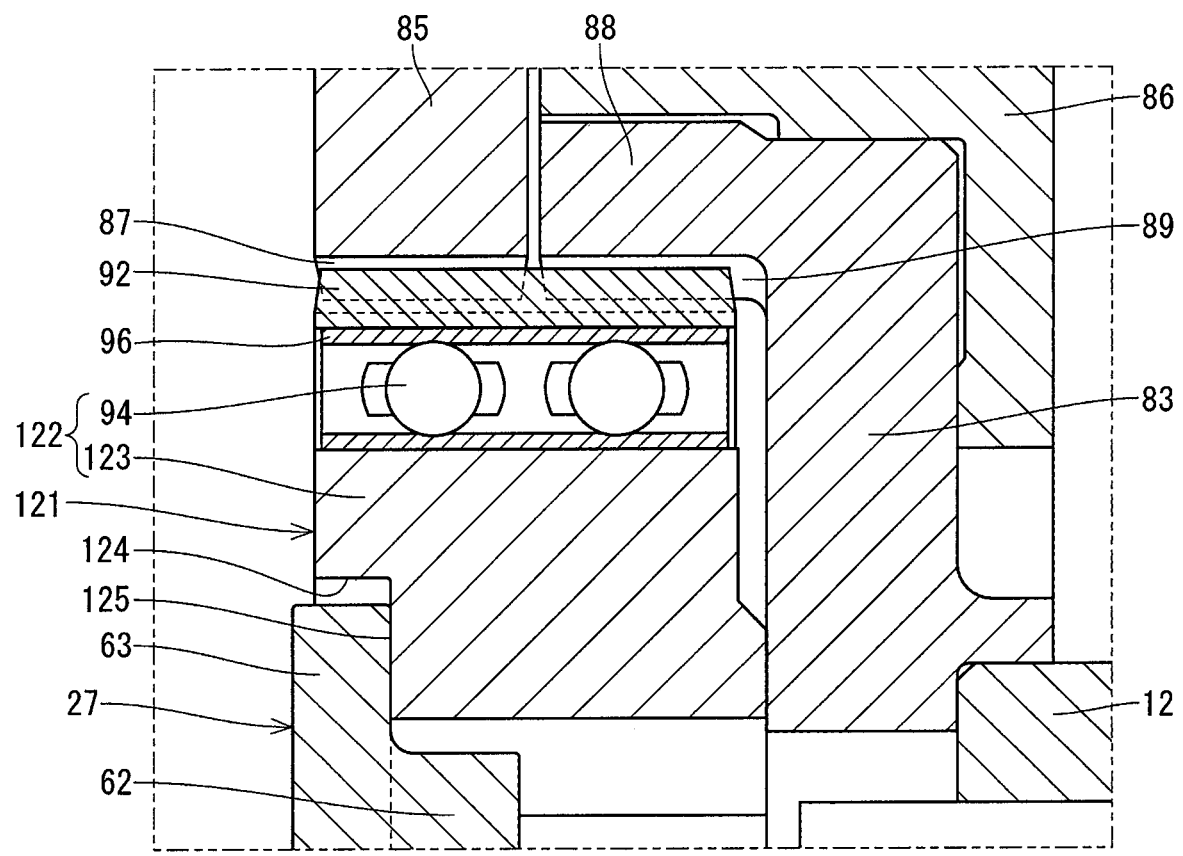
FIG. 13 is an enlarged cross sectional view showing a flex spline of a valve timing controller according to a seventh embodiment.

As shown in FIG. 13, a cam 123 of a wave generator 122 of a relative rotating portion 121 has a recessed portion 124 which accommodates at least a part of the stopper portion 63. The stopper portion 63 can abut on an inner wall surface 125 of the recessed portion 124. By accommodating a part of the stopper portion 63 in the recessed portion 124 of the cam 123, it is possible to make an axial body size compact.

Eighth Embodiment

Figure 14:
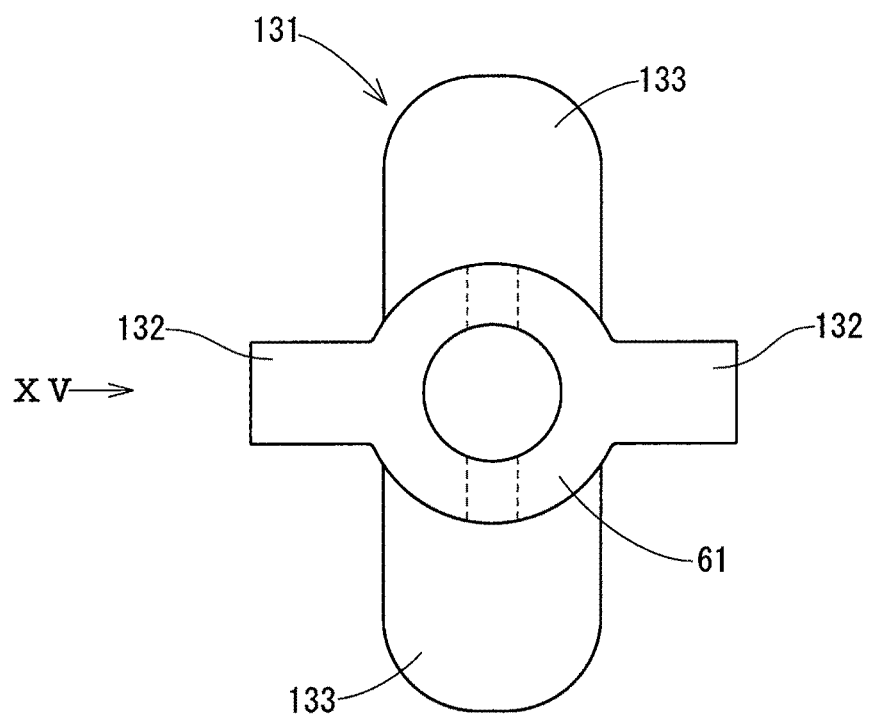
FIG. 14 is a front view of a joint of a valve timing controller according to an eighth embodiment.
Figure 15:
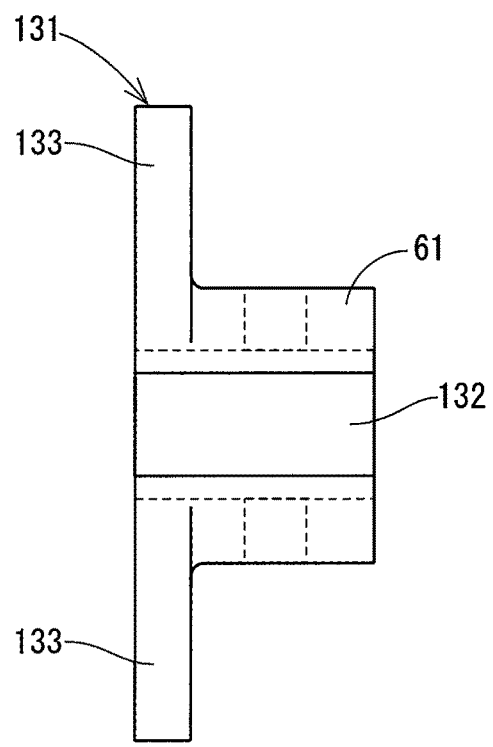
FIG. 15 is a side view of the joint in a direction of an arrow XV in FIG. 14.

As shown in FIGS. 14 and 15, the joint 131 has two rotation transmitting portions 132 at equal intervals in a circumferential direction. The stopper portion 133 is provided between two rotation transmitting portions 132 to cancel imbalance of the joint 131. By correcting the balance of the joint 131 by the stopper portion 133, it is possible to suppress a deterioration in acceleration performance of the motor 32.

Ninth Embodiment

Figure 16:
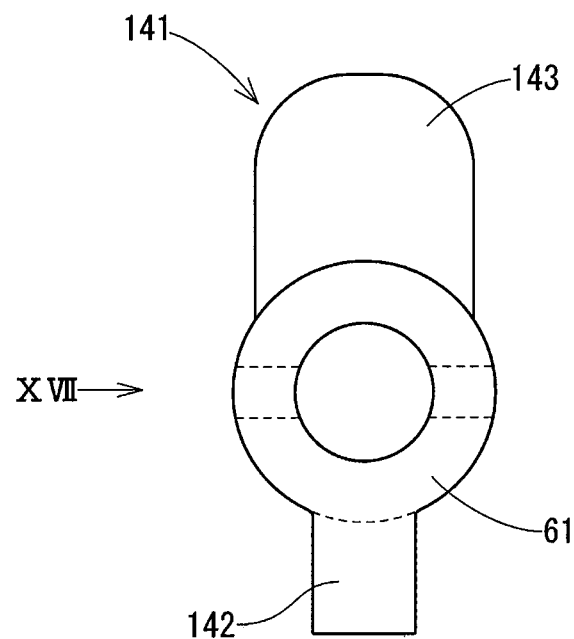
FIG. 16 is a front view of a joint of a valve timing controller according to a ninth embodiment.
Figure 17:
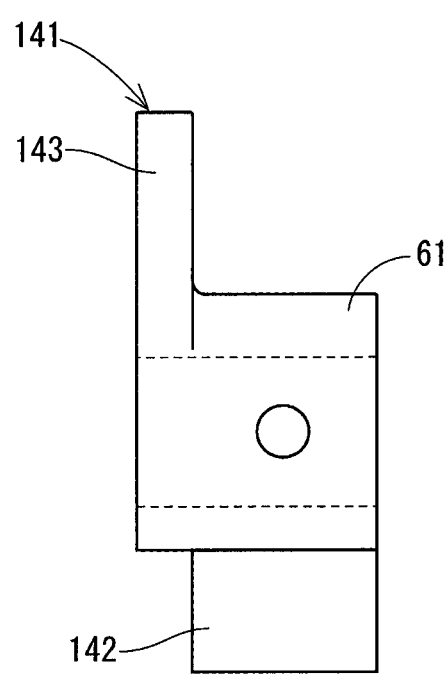
FIG. 17 is a side view of the joint in a direction of an arrow XVII in FIG. 16.

As shown in FIGS. 16 and 17, the joint 141 has one rotation transmitting portion 142 in a circumferential direction. The stopper portion 143 is provided on an opposite side of the rotation transmitting portion 142 to cancel an imbalance of the joint 141. By correcting the balance of the joint 141 by the stopper portion 143, it is possible to suppress a deterioration in acceleration performance of the motor 32.

Tenth Embodiment

Figure 18:
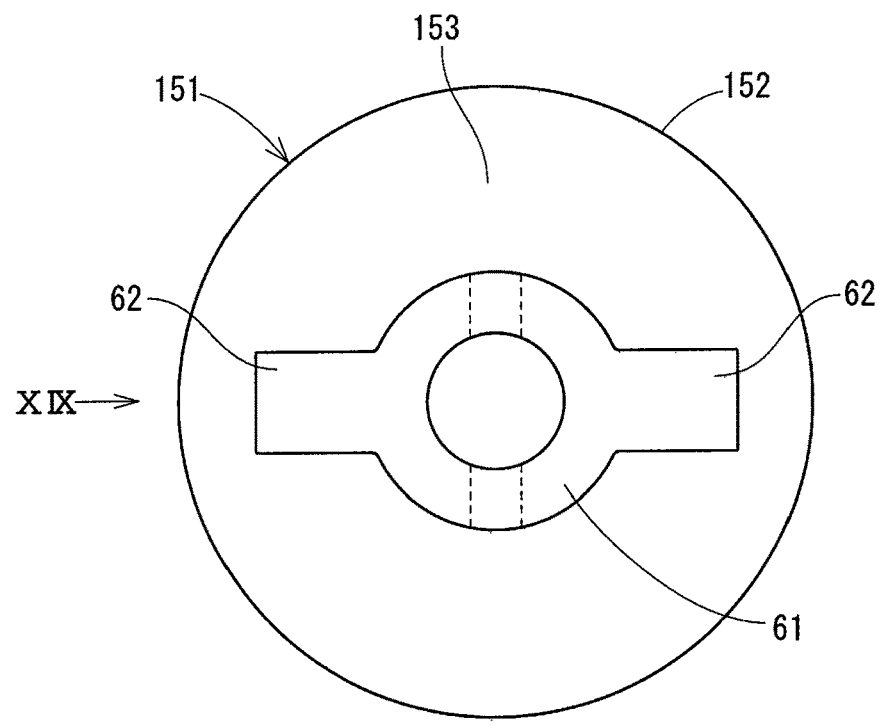
FIG. 18 is a front view of a joint of a valve timing controller according to a tenth embodiment.
Figure 19:
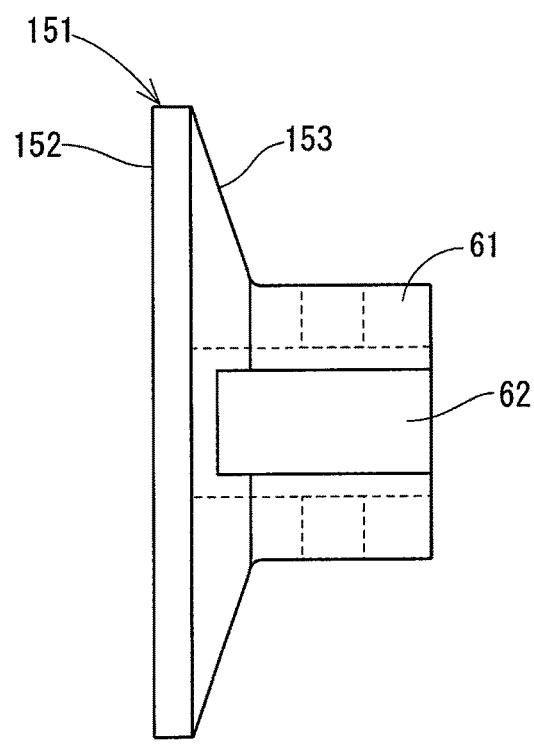
FIG. 19 is a side view of the joint in a direction of an arrow XIX in FIG. 18.

As shown in FIGS. 18 and 19, the stopper portion 152 of the joint 151 has an annular tapered surface 153 which can abut on the relative rotating portion 43 in the axial direction. The stopper portion 152 can be surely brought into contact with the relative rotating portion 43. Thus, it is avoided that noise is generated.

Other Embodiments

The joint may be connected to the output shaft by fastener such as a nut. Alternatively, the joint may be connected to the output shaft by press-inserting or screwing.

An outer diameter of the stopper portion 63 may be smaller than an outer diameter of the rotation transmitting portion 62.

The transmission mechanism portion may be configured by a pin provided to one of the planetary rotating body and the second rotating body, and a hole formed in the other of the planetary rotating body and the second rotating body. The transmission mechanism portion may be configured by an Oldham's coupling. The speed reduction mechanism unit may be provided with one speed reduction portion.

In the second embodiment, the biasing member is a disc spring. However, the biasing member may be another type of spring.

In the fifth embodiment, the tooth of the flex spline is tapered. However, the first internal spline or the second internal spline may be tapered.

In the sixth embodiment, four stoppers of the flex spline are provided at a regular interval in the circumferential direction. However, the number of the stopper of the flex spline may be three or less, or five or more.

Figure 20:
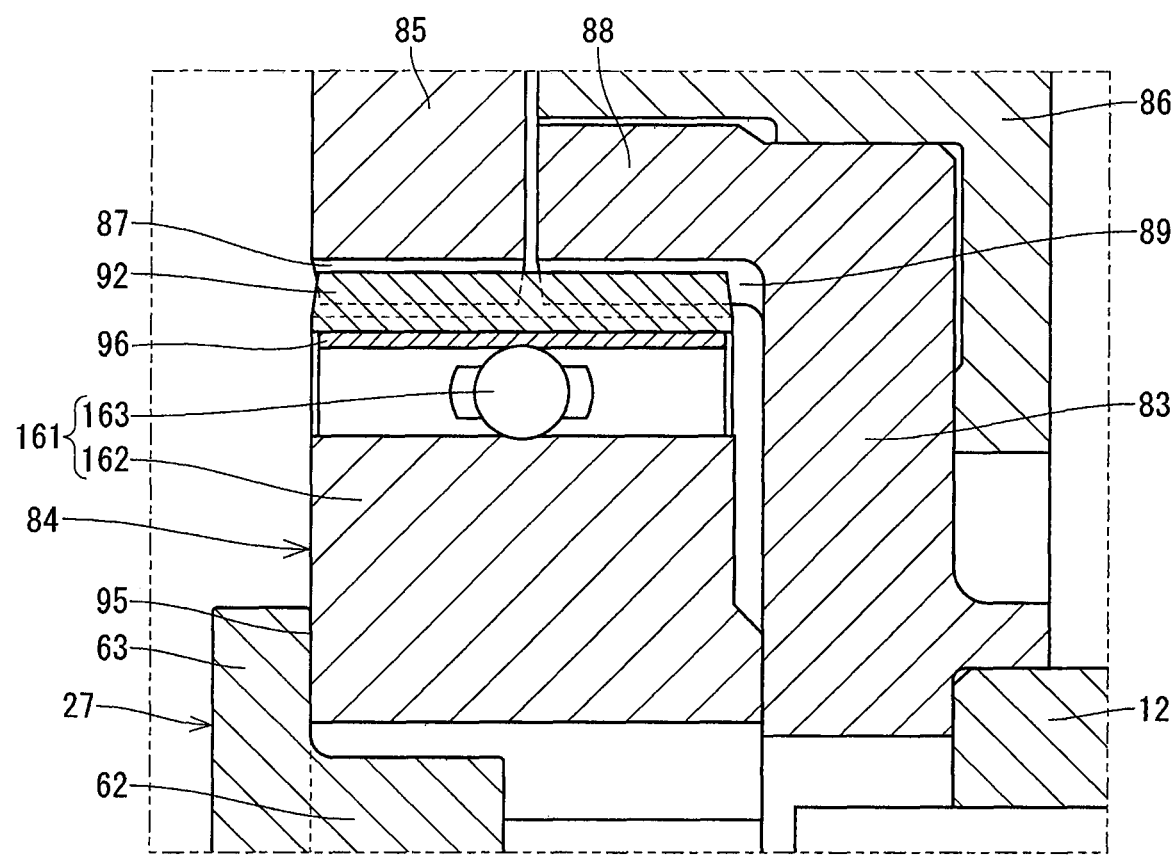
FIG. 20 is an enlarged cross sectional view showing a flex spline of a valve timing controller according to another embodiment.

As shown in FIG. 20, the cam 162 of the wave generator 161 may have a function for supporting the cam bearing 163.

The valve timing controller may be applied to an internal combustion engine which has a driving shaft other than a crankshaft.

The first rotating body may be provided on a rotation axis of the driving shaft and the second rotating body may be provided to an end of the driving shaft.

The present disclosure is not limited to the embodiments described above, and various modifications are possible within the scope of the present disclosure without departing from the spirit of the invention.

What is claimed is:

1. A valve timing controller provided in a power transmission path between a driving shaft and a driven shaft of an internal combustion engine to control a valve timing of an intake valve or an exhaust valve, the valve timing controller comprising:
    a drive unit outputting a rotational power;
    a first rotating body provided on a rotation axis of one of the driving shaft and the driven shaft to rotate synchronously with another of the driving shaft and the driven shaft;
    a second rotating body provided to an end portion of the one of the driving shaft and the driven shaft to rotate along with the one of the driving shaft and the driven shaft;
    a relative rotating portion provided in the first rotating body between the drive unit and the second rotating body, the relative rotating portion configured to move relative to the first rotating body in an axial direction, the relative rotating portion transmitting the rotational power between the first rotating body and the second rotating body, the relative rotating portion varying a relative rotation phase between the first rotating body and the second rotting body; and
    a joint connecting the drive unit and the relative rotating portion; wherein
    the joint includes:
        a rotation transmitting portion which abuts on the relative rotating portion in a circumferential direction, and
        a stopper portion which abuts on the relative rotating portion in the axial direction to restrict an axial position of the relative rotating portion.

2. The valve timing controller according to claim 1, wherein
    the drive unit includes:
    a housing,
    a motor accommodated in the housing,
    an output shaft connected to the motor and extending outside of the housing, and
    a biasing member provided in the housing to bias the output shaft toward the relative rotating portion.

3. The valve timing controller according to claim 1, wherein
    the drive unit includes:
    a housing,
    a motor accommodated in the housing,
    an output shaft connected to the motor and extending outside of the housing, and
    a pressurizing member pressurizing the output shaft toward the relative rotating portion.

4. The valve timing controller according to claim 1, wherein
    the first rotating body has an internal teeth portion,
    the relative rotating portion includes:
        an input rotating body which has an eccentric portion eccentric relative to the rotation axis and is connected to the driving unit through the joint;
        a coaxial bearing provided between the first rotating body and the input rotating body;

an eccentric bearing provided on the eccentric portion;

a planetary rotating body which is supported around an eccentric axis of the eccentric portion by the eccentric bearing and has an external teeth portion engaging with the internal teeth portion; and a transmission mechanism portion which transmits a rotation of the planetary rotating body to the second rotating body, the stopper portion is configured to abut on the input rotating body in the axial direction, and an outer diameter of the stopper portion is smaller than an inner diameter of an outer ring of the coaxial bearing.

5. The valve timing controller according to claim 1, wherein the first rotating body includes a first circular spline having a first internal spline with a first number of teeth, the second rotating body includes a second circular spline having a second internal spline with a second number of teeth that is different from the first number of teeth, the relative rotating portion includes:

a wave generator which has an elliptical cam and a cam bearing disposed around the elliptical cam, and is connected to the drive unit by the joint, and a flex spline which is an elliptical elastic member engaged with the first circular spline and the second circular spline, the stopper portion is configured to abut on the elliptical cam, and an outer diameter of the stopper portion is smaller than an inner diameter of an outer ring of the cam bearing.

6. The valve timing controller according to claim 5, wherein at least one of the flex spline, the first internal spline, and the second internal spline has an outer diameter or an inner diameter that is tapered from a side of the second rotating body to a side of the driving unit.

7. The valve timing controller according to claim 5, wherein the flex spline has a stopper which is configured to abut on the cam bearing in the axial direction.

8. The valve timing controller according to claim 1, wherein the relative rotating portion is provided with a recessed portion which accommodates at least a part of the stopper portion, the stopper portion is configured to abut on an inner wall surface of the recessed portion in the axial direction.

9. The valve timing controller according to claim 1, wherein the joint has the rotation transmitting portion on a circumferential surface of the joint, and the stopper portion is formed configured to cancel an imbalance of the joint.

10. The valve timing controller according to claim 9, wherein the stopper portion is provided on an opposite side of the rotation transmitting portion in a circumferential direction of the joint.

11. The valve timing controller according to claim 1, wherein the stopper portion of the joint has an annular tapered surface which is configured to abut on the rotation transmitting portion in the axial direction.

* * * * *